United States Patent [19]
Steinhagen

[11] 3,871,239
[45] Mar. 18, 1975

[54] VARIABLE SPEED DRIVE
[75] Inventor: Horst G. Steinhagen, Racine, Wis.
[73] Assignee: Twin Disc, Incorporated, Racine, Wis.
[22] Filed: Aug. 2, 1973
[21] Appl. No.: 385,062

[52] U.S. Cl. ................................................. 74/199
[51] Int. Cl. ............................................ F16h 15/08
[58] Field of Search .............. 74/199, 200, 201, 796

[56] References Cited
UNITED STATES PATENTS

| | | | |
|---|---|---|---|
| 1,017,893 | 2/1912 | Landis | 74/199 |
| 2,563,896 | 9/1951 | Wildhaber | 74/199 |
| 2,651,208 | 8/1953 | Karig | 74/230.17 M |
| 2,841,019 | 7/1958 | Beier | 74/199 |
| 2,958,229 | 11/1960 | Sorkin | 74/199 |
| 3,043,150 | 7/1962 | Skuba | 74/199 |
| 3,181,381 | 5/1965 | Jorgensen | 74/199 |
| 3,245,272 | 4/1966 | Flichy | 74/199 |
| 3,690,192 | 9/1972 | Bouthors et al. | 74/199 |

*Primary Examiner*—Samuel Scott
*Assistant Examiner*—Allan R. Burke
*Attorney, Agent, or Firm*—James E. Nilles

[57] ABSTRACT

Parallel power input and output shafts of a variable speed drive are spaced a fixed radial distance from each other. Axially flexible torque transmitting laminations are floatingly stacked on the input shaft and are radially interleaved with a stack of floatingly axially flexible torque transmitting laminations on the output shaft. The axial flexibility of the laminations makes them resiliently deformable sidewise and their radially overlapping portions are forced into axial spot contact with each other on an axis which extends parallel to the shafts and which is transversely adjustable from a position adjacent to the input shaft, affording a low gear ratio, to a position adjacent to the output shaft affording a high gear ratio, and vice versa.

5 Claims, 14 Drawing Figures

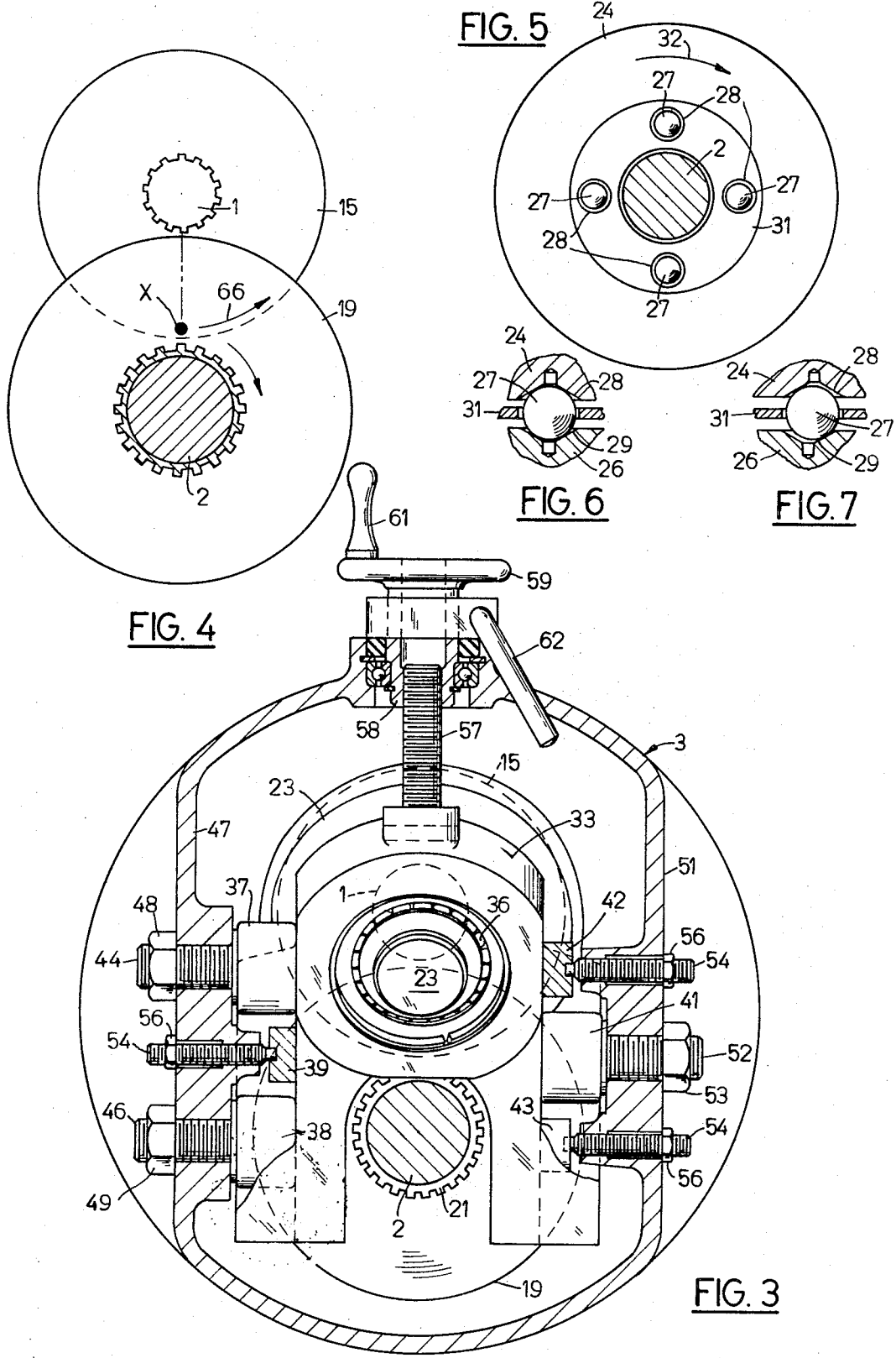

VARIABLE SPEED DRIVE

BACKGROUND

The invention relates to power transmitting mechanisms and it is concerned more particularly with a variable speed drive of the type in which driving torque is transmitted from one shaft to another by means of relatively rotatable radially interleaved friction discs.

In such drives as heretofore constructed it has been customary to provide a group of conical friction discs on one shaft and a group of circumferentially beaded friction discs on the other, the beaded discs being wedged between the conical discs, and the transmission ratio being changed by increasing and decreasing the radial spacing between the shafts. The range of speed variations obtainable with this type of drive is relatively small. Also, the need to change the shaft spacing is an undesirable feature from an engineering and manufacturing standpoint.

In another heretofore known type of variable speed drive, radially interleaved torque transmitting discs are fixedly secured respectively, to parallel shafts and the transmission ratio is changed by selectively magnetizing metal particles between the discs. While this magnetic type of drive is structurally simple, its use is limited to relatively light power levels such as in instruments.

SUMMARY OF THE INVENTION

The present invention provides an improved variable speed drive of the type wherein driving torque is transmitted from one shaft to another by means of relatively rotatable stacks of radially interleaved friction discs.

More particularly, the invention provides an improved variable speed drive of the mentioned character which affords a much wider range of speed variations than the heretofore known interleaved friction discs.

Another advantage of the improved drive according to the invention is the mounting of the shafts on fixed centers rather than on relatively adjustable centers as in the prior art.

A further feature of the invention is the use of axially flexible torque transmitting laminations which do not require costly precision manufacture and highly accurate mounting like the interleaved friction discs of the prior art.

The invention further provides a variable speed drive of the mentioned character wherein the shafts on which the laminations are mounting transmit no axial thrust loads to their supporting bearings.

The improved variable speed drive according to the invention lends itself to use at relatively high power levels; and it involves relatively few component parts forming a compact unit which will function reliably and efficiently under severe operating conditions.

The foregoing and other features and advantages of the invention will become more fully apparent from the following description of several embodiments shown by the accompanying drawings.

DRAWINGS

FIG. 3 is a sectional view on line 3—3 of FIG. 1;

FIG. 4 is a sectional view on line 4—4 of FIG. 1;

FIG. 5 is a detail view on line 5—5 of FIG. 1, showing parts of a torque responsive axial thrust creating coupling device;

FIGS. 6 and 7 are sectional detail views showing parts of a torque responsive axial thrust creating coupling device in different relative positions;

DETAILED DESCRIPTION

Figure 1:
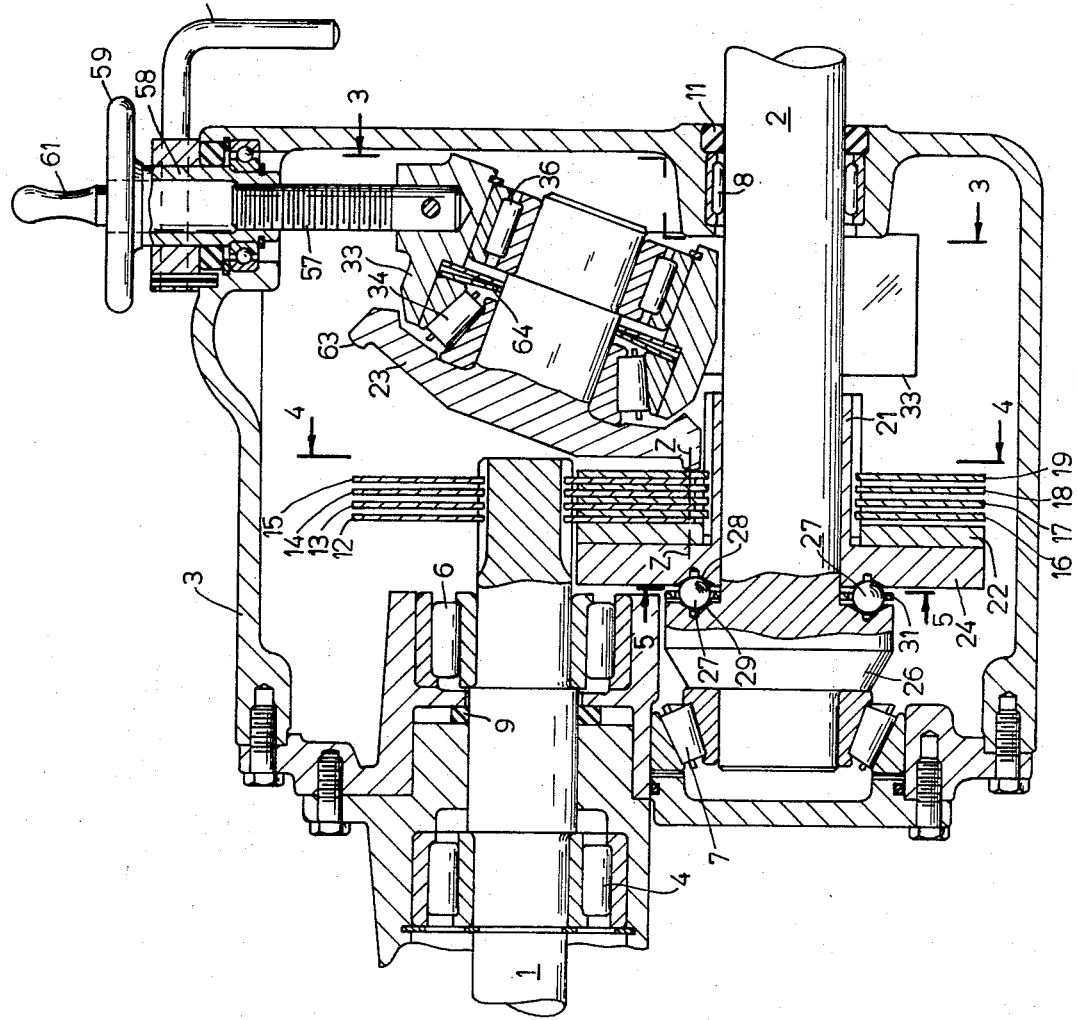
FIG. 1 is a vertical longitudinal section of a variable speed drive incorporating the invention.

The variable speed drive shown in FIG. 1 is generally of the type wherein driving torque is transmitted from one shaft to another by means of relatively rotatable stacks of radially interleaved friction discs. One of the shafts, designated by the reference numeral 1, is the power input shaft, and the other, designated by the reference numeral 2, is the power output shaft. The input shaft 1 is rotatably supported in a transmission housing 3 by a pair of axially spaced roller bearings 4 and 6, and the output shaft 2 is rotatably supported in the transmission housing 3 in parallel relation to and at a fixed radial spacing from the input shaft 1 by a conical roller bearing 7 and a needle bearing 8. Oil seals 9 and 11 around the shafts 1 and 2 prevent the escape of lubricant from the transmission housing.

A stack of four axially flexible torque transmitting laminations 12, 13, 14 and 15 are spline mounted on the inner end of the input shaft 1 in axially shiftable relation thereto and to each other. Another stack of four axially flexible torque transmitting laminations 16, 17, 18 and 19 are coaxially supported on the output shaft 2 and radially interleaved with the laminations of the shaft 1. A flanged sleeve 21 is rotatably supported on the output shaft 2. Torque transmitting coupling means including coupling balls 27 are operatively interposed between the output shaft 2 and the sleeve 21, and the laminations 16–19 of the second stack are spline mounted on the sleeve 21. The sleeve 21 and associated coupling device thus provide means connecting the laminations of the second stack in torque transmitting axially shiftable relation to the output shaft 2 and to each other. Other numbers of lamination may be used.

Clamping means are provided to force the radially overlapping portions of the interleaved laminations 12–15 and 16–19 into axial spot contact with each other on an axis which extends parallel to the shafts 1 and 2 and is adjustable transversely back and forth therebetween. Such clamping means comprise two abutments at the axially opposite sides, respectively, of the interleaved laminations 12–15 and 16–19, one of said abutments being afforded by a washer 22 bearing against the driving lamination 12, and the other abutment being afforded by an inclined roller 23 bearing peripherally against the driven lamination 19.

The washer 22 is backed by the flange 24 of the sleeve 21 which is in turn backed by a collar 26 of the output shaft 2 and by a circumferential series of balls 27 between the flange 24 and the collar 26. As shown in FIGS. 5, 6 and 7, opposite conical pockets 28 and 29 seating the balls 27 are provided in the flange 24 and in the shaft collar 26, and a cage ring 31 for the balls is floatingly positioned between the flange 24 and collar 26. FIG. 6 illustrates the seated position which the balls 27 occupy in the pockets 28 and 29 while the shafts 1 and 2 are at standstill and no torque load is transmitted from one to the other. FIG. 7 similarly illustrates the seated position which the balls 27 occupy in the pockets 28 and 29 while a driving torque is transmitted from one shaft to the other through the interleaved laminations 12–15 and 16–19 as will be more fully discussed hereinbelow. A torque acting on the sleeve 21 in the direction of arrow 32 in FIG. 5 is not only transmitted to the shaft 2 by the wedged condition of the balls in the pockets as shown in FIG. 7, but it also creates an axial separating thrust between the flange 24 and the collar 26 which becomes progressively stronger as the torque load acting upon the sleeve 21 increases. The balls 27 and pockets 28, 29 provide in effect a torque responsive axial thrust creating coupling between the sleeve 21 and the output shaft 2.

Figure 11:
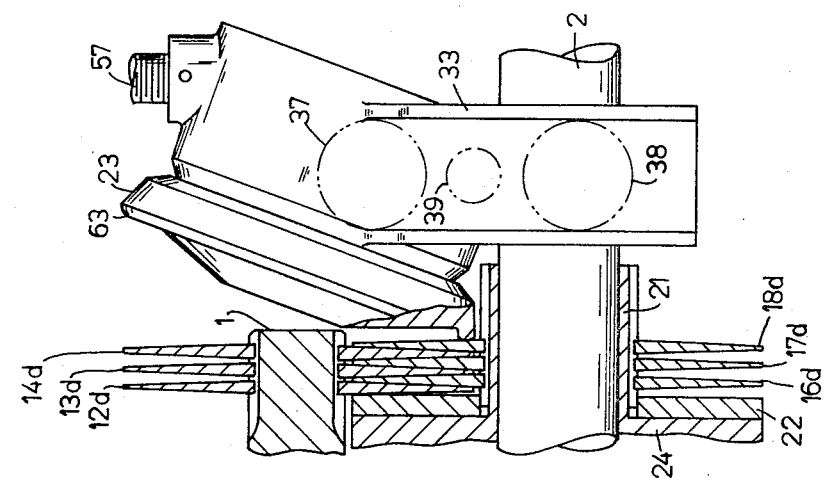
FIGS. 8, 9, 10 and 11 are sectional detail views illustrating modifications of an interleaved lamination assembly shown in FIG. 1, a roller type abutment structure shown in section in FIG. 1 being shown in elevation in FIGS. 9 and 11.
Figure 9:
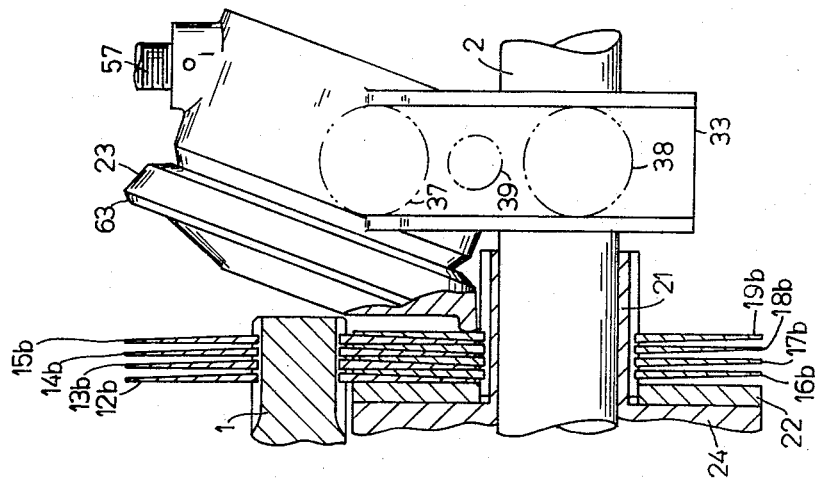

The roller 23 is rotatably supported in an up and down adjustable yoke like support 33 by means of a tapered roller bearing 34 and a cylindrical roller bearing 36. As shown in FIG. 3, the roller support 33 straddles the output shaft 2 and is guided at one side by two rollers 37, 38 and a friction pad 39, and at the other side by one roller 41 and two friction pads 42 and 43. The rollers 37, 38 are rotatably mounted on threaded studs 44, 46 which extend through a side wall portion 47 of the transmission housing and are retained thereon by nuts 48 and 49. The roller 41 is similarly mounted on a side wall portion 51 of the transmission housing by means of a threaded stud 52 and a nut 53. The side of the roller support 33 adjacent the housing wall 47 is channeled as shown in FIGS. 9 and 11 to receive the rollers 37 and 38 and the friction pad 39. The opposite side of the support 33 adjacent the housing wall 51 is similarly channeled to receive the roller 41 and the friction pads 42, 43. Each of the pads 39, 42 and 43 is supported on the tip of a threaded stud 54 for in and out adjustment relative to the roller support 33. After the pads have been properly adjusted to insure free up and down movement of the support 33 along the rollers 37, 38 and 41 substantially without lateral play, jam nuts 56 on the studs 54 are drawn up to lock the pads in their adjusted positions.

A manually adjustable mechanism for raising and lowering the roller support 33 within the housing 3 comprises a threaded stem 57 on the support 33 and a rotary sleeve 58 on the housing 3 in threaded engagement with the stem 57. The upper end of the sleeve 58 is provided with a hand wheel 59 and a handle 61, and a brake for locking the sleeve 58 against rotation may be set and released by a hand lever 62.

As shown in FIG. 1, the axis on which the roller 23 is rotatable within the up and down adjustable support 33 extends in acute angle relation to the axes of the input and output shafts 1 and 2. The roller 23 has a beaded rim 63 with a round face which in the assembled condition of the drive contacts the driven lamination 19 at only one point, and which point is located on the beaded rim 63 directly below the axis of the shaft 1 and directly above the axis of the shaft 2. A Belleville washer 64 is operatively interposed between the roller support 33 and the conical roller bearing 34, and the pressure of that washer keeps the roller 23 in axial spot contact with the outer side of the driven lamination 19.

In FIG. 4, the reference character X marks the spot on which the driven lamination 19 is contacted by the beaded rim 63 of the roller 23. The thrust of the roller 23 which is applied to the lamination 19 at the spot X on the outer side of the lamination is transmitted at the inner side of the lamination upon the adjacent side surface of the driving lamination 15. Transmission of the roller thrust continues toward the washer 22 through the radially overlapping portion of the driving and driven laminations, and since the washer 22 is backed by the flange 24, by the balls 27 and by the collar 26, the thrust of the roller 23 upon the lamination 19 at the contact spot X is finally taken up on the housing 3 through the conical roller bearing 7.

When a driving torque is applied to the shaft 1 in one direction or the other, say in the direction of arrow 66 in FIG. 4, the driving laminations 12–15 and the driven laminations 16–19 will rotate relative to each other in the manner of a pair of gear wheels which are keyed to the shafts 1 and 2 and mesh with each other at the point X. In other words, the driving torque will be transmitted from the laminations 12–15 to the laminations 16–19 only in the radially and tangentially narrow zone where the driving and driven laminations are clamped together between the roller 23 and the abutment washer 22. That zone extends on an axis parallel to the axes of the shafts 1 and 2, and is symbolically indicated in FIG. 1 by the dash-dotted line Z—Z. As already mentioned, the flange 24 of the mounting sleeve 21 for the driven laminations 16–19 and washer 22 tends to separate from the collar 26 of the shaft 2 in the direction toward the roller 23 when torque is transmitted from the flange 24 to the collar 26 through the balls 27. Consequently, the clamping thrust which is exerted by the Belleville washer 64 upon the radially overlapping portions of the interleaved laminations 12–15 and 16–19 is strongly augmented by the thrust which is developed by the balls 27 while driving torque is transmitted from the shaft 1 to the shaft 2 in one direction or the other. The same action will of course take place if the driving torque is applied in one direction or the other to the shaft 2 and the shaft 1 is the driven shaft. In other words, the variable speed drive incorporating the invention may be operated in forward or reverse directions irrespective of whether the torque is transmitted from shaft 1 to shaft 2, or vice versa.

Figure 2:
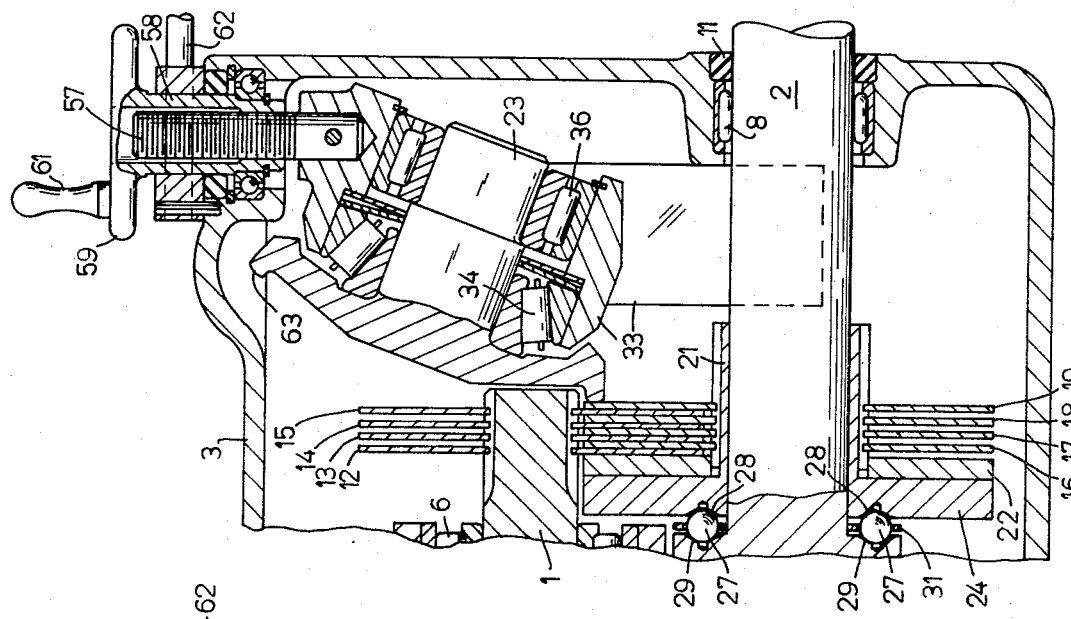
FIG. 2 is a partial view like FIG. 1 with parts shown in a different position of adjustment.

FIG. 1 shows the roller support 33 adjusted to a position in which the contact Z—Z is located at its maximum radial distance from the axis of the drive shaft 1. Such positioning of the contact axis Z—Z affords a speed increasing gear ratio between the shafts 1 and 2. The gear ratio may readily be changed by rotation of the hand wheel 59. When the roller support 33 is raised to its upper limit position as shown in FIG. 2 a speed reducing driving connection is established between the shafts 1 and 2.

The axial flexibility of the driving and driven laminations which makes them resiliently deformable sidewise is critical for the described gear-like coaction of the driving laminations 12–15 and driven laminations 16–19. Flat spring steel laminations of a thickness of thirty three thousandths of an inch (0.033 inch) for example, may be used.

Figure 8:
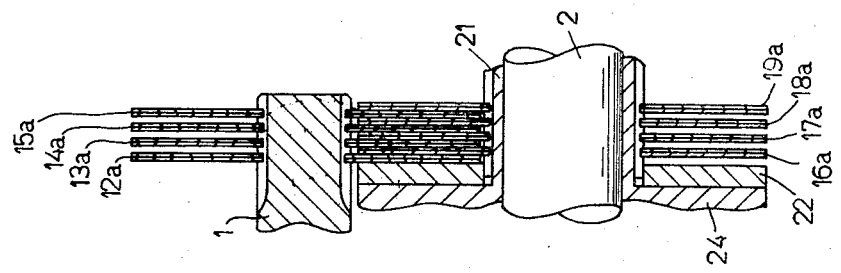

FIGS. 8 to 11 show various modifications of the interleaved torque transmitting laminations. In FIG. 8 two-layer laminations 12a, 13a, 14a and 15a are spline mounted on the driving shaft 1, and two layer laminations 16a, 17a, 18a and 19a are spline mounted on the supporting sleeve 21.

In FIG. 9 the driving laminations consist of axially flexible, radially outward tapering sheet metal discs 12b, 13b, 14b and 15b, and the driven laminations consist of radially outward tapering sheet metal discs 16b, 17b, 18b and 18b. The discs 12b – 15b are flat at their sides facing toward the washer 22, and conical at their sides facing toward the roller 23. The discs 16b – 19b are similarly flat at one side and conical at the other but they are stacked in reversed positions relative to the discs 12b – 15b so that the conical sides of the driving discs bear against the conical sides of the driven discs, and so that the flat sides of the driving discs 13b – 15b bear against the flat sides of the driven discs 16b – 18b.

Figure 10:
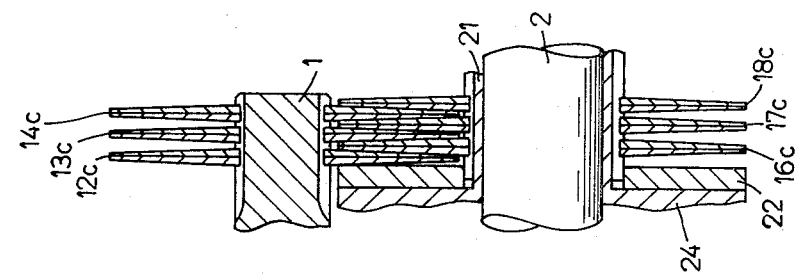

In FIG. 10 double layer driving laminations 12c – 14c taper radially outward and are interleaved with outwardly tapering double layer driven laminations 16c – 18c. Each double layer driving lamination of FIG. 10 may consist of two of the driving discs of FIG. 9 paired back to back; and each double layer driven lamination in FIG. 10 may consist of two of the driven discs of FIG. 9 paired back to back.

In FIG. 11, the driving laminations consist of radially outward tapering sheet metal discs 12d – 14d which are conical at both sides, and the driven laminations similarly consist of radially outward tapering sheet metal discs 16d – 18d which are conical at both sides.

The modified laminations of FIGS. 9 – 11 are more readily deformable radially as well as tangentially than the plane laminations shown in FIG. 1, and therefore provide a contact zone of very limited radial and tangential extent.

Figure 12:
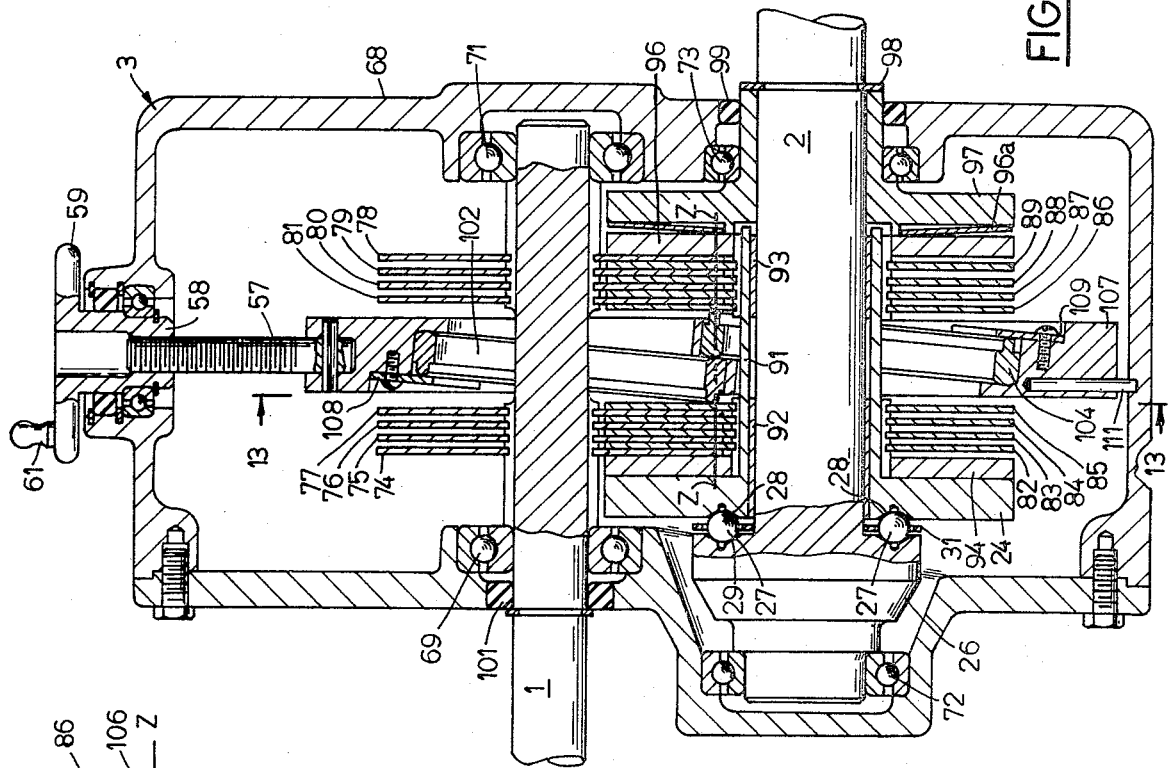
FIG. 12 is a vertical longitudinal section of a modification of the variable speed drive shown in FIG. 1.
Figure 14:
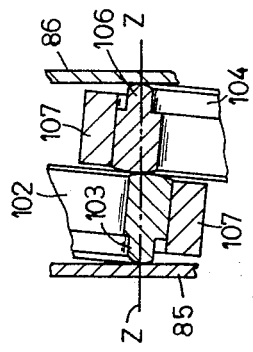
FIG. 14 is an enlarged partial view of a portion of FIG. 12.
Figure 13:
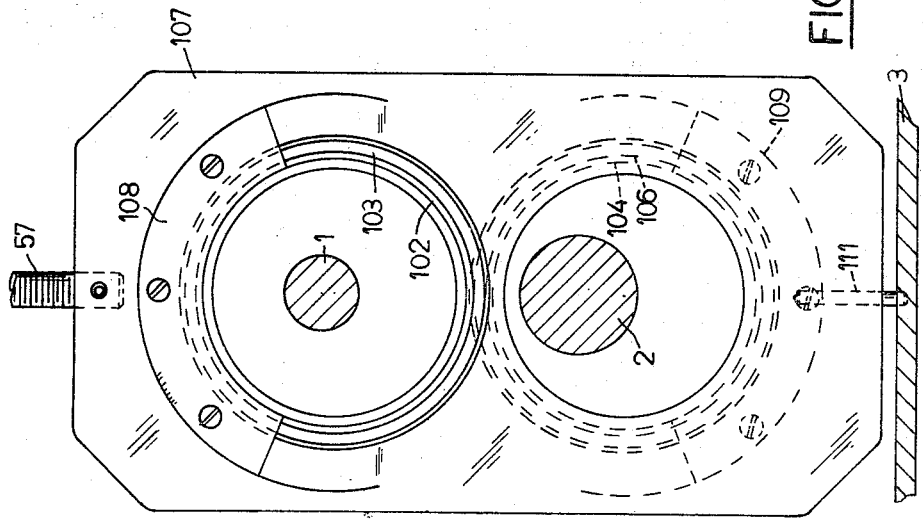
FIG. 13 is a partial section on line 13—13 of FIG. 12.

The variable speed drive shown in FIGS. 12 – 14 is a modification of the drive shown in FIG. 1 –7, corresponding parts being designated by the same reference numerals. In the modified drive the input shaft 1 as well as the output shaft 2 are straddle mounted within the transmission hosuing 3, the shaft 1 being supported in opposite side walls 67, 68 of the housing by ball bearings 69 and 71, and the output shaft 2 being supported in the same walls by ball bearings 72 and 73. A first stack of driving laminations 74 – 77, and a second stack of driving laminations 78 – 81 are spline mounted on axially spaced portions of the shaft 1 in laterally shiftable relation thereto and to each other. A first stack of driven laminations 82 – 85 and a second stack of driven laminations 86 – 89 are spline mounted on axially spaced portions of a sleeve 91 on the output shaft 2. The sleeve 91 is rotatably supported on bushings 92 and 93 for rotation around the shaft 2 and axial shifting movement relative thereto. Like the sleeve 21 of the drive shown in FIG. 1, the sleeve 91 of the drive shown in FIG. 12 has a flange 24 which is connected by a torque responsive axial thrust creating coupling device with the output shaft 2, the coupling device incorporating a circumferential series of balls 27 the same as in FIG. 1. The first stack of driving laminations 74 – 77 is radially interleaved with the first stack of driven laminations 82 – 85, and the second stack of driving laminations 78 – 81 is radially interleaved with the second stack of driven laminations 86 – 89. A thrust washer 94 is operatively interposed between the driving lamination 74 and the flange 24 of the sleeve 91 and another thrust washer 96 is mounted on the end of the sleeve 91 in axially abutting relation to the driving lamination 78. A pre-loading Bellville spring 96a is located between washer 96 and an abutment plate 97 which is sleeved upon the output shaft 2 indepdnently of the sleeve 91 and secured against axial outward shifting by a snap ring 98. The inner race of the ball bearing 73 is fitted upon the sleeve portion of the abutment plate 97 and the outer race of the bearing 73 is seated in the side wall 68 of the housing 3. An oil seal 99 around the sleeve portion of the abutment 97 and an oil seal 101 around the input shaft 1 prevent the escape of lubricant from the transmission housing 3.

Rotatably mounted in the space between the first and second stacks of driving laminations 74 – 77 and 78 – 81 is a race ring 102 which has a beaded rim 103 (FIG. 14) in spot contact with the driven lamination 85 on a horizontal axis indicated by the dash-dotted line Z—Z in FIG. 14. Another race ring 104 is rotatably mounted in the space between the first and second driven laminations 82 – 85 and 86 – 89, and a beaded rim 106 of the race ring 104 bears against the driven lamination 86 in spot contact therewith on the axis Z—Z as shown in FIG. 14. The races 102 and 104 are rotatably mounted in a supporting plate or carrier frame 107 which is suspended from the adjusting spindle 57 and movable back and forth by the latter transversely of the shafts 1 and 2. A segmental retainer plate 108 retains the race ring 102 in the upper portion of the supporting plate 107 and a similar retainer plate 109 retains the race ring 104 in the lower part of the supporting plate 107. The race 102 is slanted relative to the input shaft 1 so that only its lower part contacts the driven lamination 85 and the race 104 is similarly slanted so that only its upper part contacts the driven lamination 86. The relatively adjacent sides of the races 102 and 104 are crowned and bear upon each other on the axis Z—Z as shown in FIG. 14.

When a driving torque is applied in either direction to the input shaft 1 of the drive shown in FIG. 12, the axial thrust created by the coupling balls 27 forces the flanged sleeve 91 axially toward the abutment 97 and as a result, the driving laminations 74 – 77 are forced into torque transmitting engagement with the driven laminations 82 – 85 on the axis Z—Z, and at the same time, the driving laminations 78 – 81 are forced into torque transmitting engagement with the driven laminations 86 – 89 in line with the axis Z—Z. Driving torque will therefore be transmitted from the shaft 1 to the shaft 2 simultaneously from both stacks of driving laminations 82–85 and 86–89 to both stacks of driven laminations. The gear ratio between the shafts 1 and 2 which is established by the coaction of the two stacks of driving laminations with the two stacks of driven laminations may readily be changed by up and down adjustment of the race supporting plate 107. A guide pin 111 extends upwardly from the bottom of the transmission housing 3 into the lower part of the race supporting plate 107 so as to center the plate between the stacks of driving and driven torque transmitting laminations. In the adjusted position of the race supporting plate 107 as shown in FIG. 12, a speed increasing driving connection is established between the input shaft 1 and the output shaft 2 and upward adjustment of the race supporting plate 107 by means of the hand reel 59 first reduces and then reverses the gear ratio between the driving and driven shafts.

I claim:

1. A variable speed drive comprising a transmission housing; a power input shaft and a power output shaft rotatably mounted in said housing on parallel, transversely spaced axes; first stacks of relatively rotatable radially interleaved axially flexible torque transmitting laminations operatively connected, respectively, with said shafts; second stacks of relatively rotatable radially interleaved axially flexible torque transmitting laminations operatively connected, respectively, with said shafts in axially spaced relation to said first stacks; annular race members respectively surrounding said shafts in the space between said first and second stacks of interleaved laminations; a carrier frame for said race members mounted within said housing for back and forth adjustment transversely of said shafts; said race members being rotatably mounted in said carrier frame in cooperable, axial thrust transmitting relation, respectively, with said first and second lamination stacks; abutment discs at the axially outer sides, respectively, of said first and second lamination stacks; and pressure means operable to compress said first lamination stacks between the adjacent abutment disc and one of said race members, and to simultaneously compress said second lamination stacks between the adjacent abutment disc and the other of said race members.

2. A variable speed drive as set forth in claim 1, wherein said race members are supported within said carrier frame in laterally inclined positions relative to said lamination stacks.

3. A variable speed drive as set forth in claim 2, wherein said race members are supported within said carrier frame in radially overlapping axial thrust transmitting relation to each other.

4. A variable speed drive comprising: a transmission housing; a pair of power transmitting shafts rotatably mounted in said housing on parallel axes at a fixed radial spacing from each other; a first stack of axially flexible torque transmitting laminations operatively connected with one of said shafts in axially shiftable relation thereto and to each other; a flanged sleeve element rotatably mounted on the other of said shafts; torque transmitting coupling means operatively interposed between said other shaft and said sleeve element; a second stack of axially flexible torque transmitting laminations operatively connected with said sleeve element in axially shiftable relation thereto and to each other; said laminations of said second stack being radially interleaved with said laminations of said first stack; and clamping means comprising the flange of said sleeve element at one side of said radially interleaved laminations and a pressure roller at the other side of said radially interleaved lamination operable to force said interleaved laminations into axial spot contact with each other on an axis extending parallel to said shafts and adjustable transversely back and forth therebetween.

5. A variable speed drive as set forth in claim 4 wherein said coupling means between said other shaft and said sleeve element comprise a torque responsive axial thrust creating coupling device.

* * * * *